(12) United States Patent
Jeanneteau et al.

(10) Patent No.: US 8,736,248 B2
(45) Date of Patent: May 27, 2014

(54) DETECTION CIRCUIT AND A METHOD FOR DETECTING A WRONG SUPPLY VOLTAGE

(75) Inventors: Laurent Jeanneteau, Compiegne (FR); Roberto Ferrozzi, Bologna (IT); Erik Svend Christiansen, Faenza (IT); Mario Barocci, Cesena (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 1072 days.

(21) Appl. No.: 12/677,371

(22) PCT Filed: Apr. 30, 2008

(86) PCT No.: PCT/EP2008/003483
§ 371 (c)(1),
(2), (4) Date: Mar. 10, 2010

(87) PCT Pub. No.: WO2009/039898
PCT Pub. Date: Apr. 2, 2009

(65) Prior Publication Data
US 2010/0207656 A1 Aug. 19, 2010

(30) Foreign Application Priority Data
Sep. 24, 2007 (EP) ..................... 07018682

(51) Int. Cl.
*G01R 19/00* (2006.01)
(52) U.S. Cl.
USPC ................ 324/66; 324/67; 324/508
(58) Field of Classification Search
USPC ............... 324/99 R, 66, 67, 508, 528
See application file for complete search history.

(56) References Cited

U.S. PATENT DOCUMENTS

| | | | | | |
|---|---|---|---|---|---|
| 3,767,887 | A | * | 10/1973 | Harder | 219/98 |
| 4,091,434 | A | * | 5/1978 | Suzuki et al. | 361/100 |
| 4,264,785 | A | * | 4/1981 | Jacobson | 379/78 |
| 5,497,094 | A | * | 3/1996 | George | 324/529 |
| 5,561,596 | A | * | 10/1996 | Hemena et al. | 363/50 |
| 5,929,663 | A | * | 7/1999 | Dougherty | 327/101 |
| 6,466,029 | B2 | * | 10/2002 | Stroth et al. | 324/509 |

(Continued)

FOREIGN PATENT DOCUMENTS

| | | |
|---|---|---|
| GB | 2013424 | 8/1979 |
| WO | 03073579 | 9/2003 |

OTHER PUBLICATIONS

International Search Report for PCT/EP2008/003483, dated Sep. 29, 2008, 2 pages.

*Primary Examiner* — Richard Isla Rodas
(74) *Attorney, Agent, or Firm* — Pearne & Gordon LLP

(57) ABSTRACT

The present invention relates to a detection circuit for detecting that a power supply unit is connected to a wrong supply voltage. Said detection circuit comprises a first voltage divider (24, 26, 28) connected to the output terminals (20, 50) of a rectifier (16) of the power supply unit, a second voltage divider (26, 32) connected to a first power input terminal (10) of the power supply unit and to one of the output terminals (20, 50) of the rectifier (16), and a circuit breaker (14) connected to the first power input terminal (10) of the power supply unit and to an input terminal of the rectifier (16), wherein at least one partial voltage of each voltage divider (24, 26, 28; 26, 32) is used a signal (22, 46) for identifying the wrong supply voltage. The invention relates further to a method for detecting that a power supply unit is connected to a wrong supply voltage.

30 Claims, 2 Drawing Sheets

(56) References Cited

U.S. PATENT DOCUMENTS 6,541,954 B1 * 4/2003 Gluszek ............... 324/107
6,686,725 B1 * 2/2004 Choi et al. ............... 323/207
6,747,458 B2 * 6/2004 Huber et al. ............... 324/527

* cited by examiner

DETECTION CIRCUIT AND A METHOD FOR DETECTING A WRONG SUPPLY VOLTAGE

The present invention relates to a detection circuit for detecting that a power supply unit is connected to a wrong supply voltage according to claim 1. Further the present invention relates to a method for detecting that a power supply unit is connected to a wrong supply voltage according to claim 17.

Power lines in homes have a voltage either of 230 V with one line or of 230 V/400 V with three lines. In this last case, when assembling, the operator can connect the cooking appliance with different voltages. A typical consumer supply voltage is 230 V for an induction hob. In order to avoid destruction when a supply voltage of 400 V is installed, detection circuits are recommended.

Such cooking appliances and induction hobs comprise at least one power supply unit, which is provided to be connected to a voltage source of 400 V. However, if a power supply unit provided for the voltage of 230 V is connected to a 400 V, then said power supply unit will be destroyed.

In order to recognize or detect, if the power supply unit is connected to the wrong voltage source, the cooking oven and/or the induction hob comprise a detection circuit. Said detection circuit is able to detect, if the power supply unit is connected to the wrong voltage source.

Figure 2:
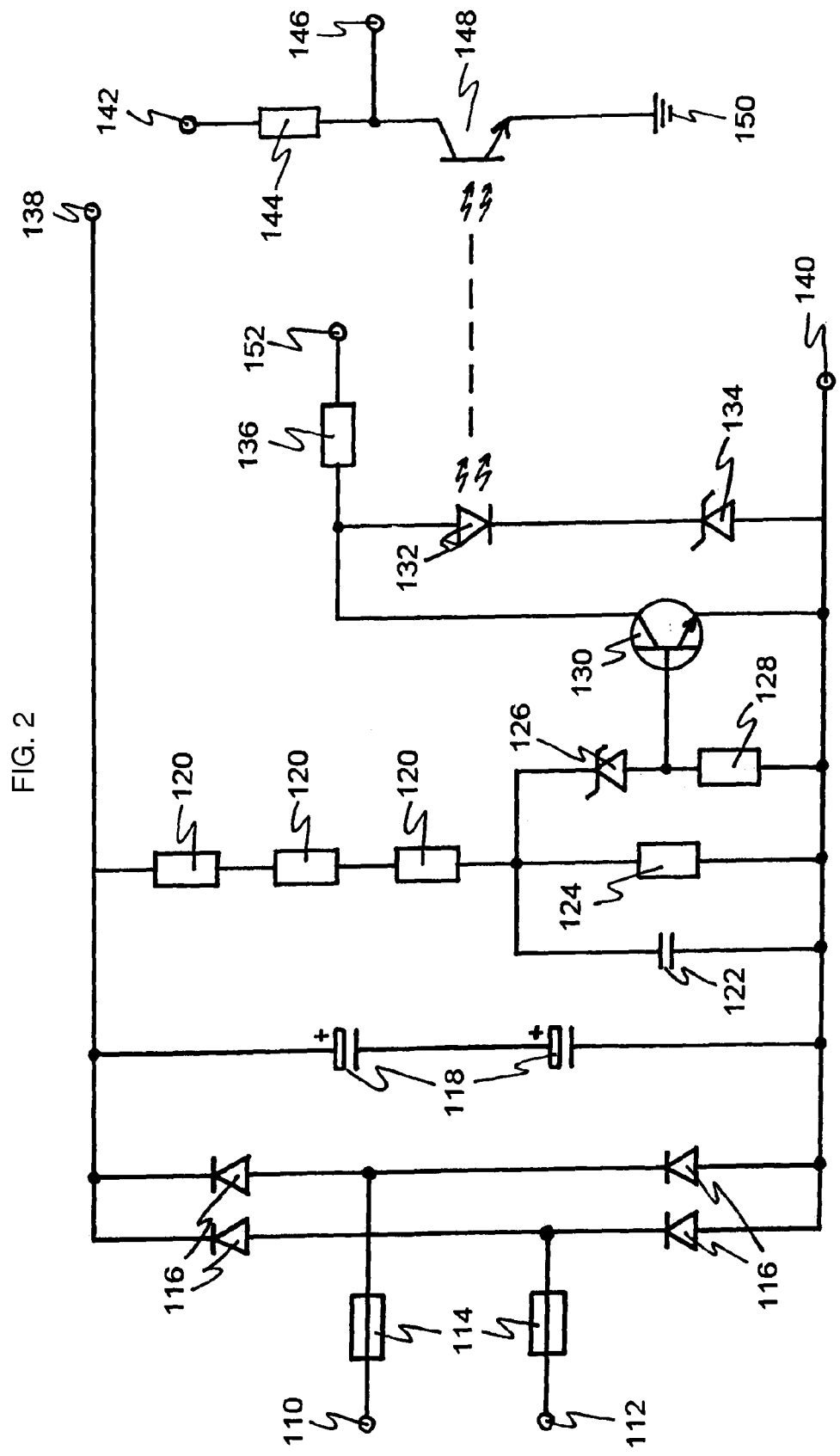

FIG. 2 illustrates a schematic diagram of a detection circuit according to the prior art. The known detection circuit comprises a first input terminal 110 for the phase of the alternating current and a second input terminal 112 for the neutral conductor of the alternating current. The first input terminal 110 and the second input terminal 112 are connected via two metal oxide resistor elements 114 to a set of four diodes 116 forming a rectifier. The rectifier includes a first power output terminal 138 and a second power output terminal 140. Between the power output terminals 138 and 140 two electrolytic capacitors 118 are serially interconnected. Additionally, between the output terminals of the rectifier a series of three resistor elements 120 and a circuit with parallel elements are interconnected. Said parallel elements are a capacitor 122, a resistor element 124 and a series of a diode 126 and a resistor element 128.

Further, the known detection circuit comprises a transistor 130. The basis of the transistor 130 is connected to the crosspoint of the diode 126 and the resistor element 128. The emitter of the transistor 130 is connected to the second power output terminal 140. Between the collector and the emitter of the transistor 130 a series of a light emitting diode 132 and breakdown diode 134 is interconnected. The light emitting diode 132 is a first part of an optical coupler. A resistor element 136 is interconnected between the collector of the transistor 130 and a voltage input terminal 152.

A series of a resistor element 144 and a photoelectric cell 148 is interconnected between a further voltage input terminal 142 and a ground terminal 150. In this example the direct-current voltage on the voltage input terminal 142 is 5 V. The crosspoint between the resistor element 144 and the photoelectric cell 148 form a signal output terminal 146. The photoelectric cell 148 forms a second part of the optical coupler. There is no galvanic connection between the resistor element 144 and the photoelectric cell 148 on the one hand and the residual part of the circuit on the other hand. The only connection between said circuits is the light beam between the light emitting diode 132 and the photoelectric cell 148.

The alternating current between the first input terminal 110 and the second input terminal 112 is converted into a pulsating current by the rectifier. The electrolytic capacitors 118 convert the pulsating current into a substantial constant current. The circuitry on the left from the electrolytic capacitors 118 is provided to recognize, if the voltage between the power output terminals 138 and 140 exceeds a predetermined value. A corresponding signal is sent from the light emitting diode 132 to the photoelectric cell 148, if the voltage between the power output terminals 138 and 140 exceeds said predetermined value. From the signal output terminal 146 said corresponding signal is sent to a control unit, e.g. a microprocessor.

The circuit shown in FIG. 2 comprises a lot of electronic elements. A substantial part of these electronic elements are very costly.

It is an object of the present invention to provide a detection circuit for detecting that a power supply unit is connected to a wrong supply voltage, wherein said detection circuit comprises a reduced number of electronic elements and/or comprises more low cost elements. It is also an object of the invention to provide a corresponding method.

This object of the present invention is achieved by the detection circuit according to claim 1.

According to the present invention the detection circuit comprises:
  a first voltage divider connected to the output terminals of
    a rectifier of the power, supply unit,
  a second voltage divider connected to a first power input
    terminal of the power supply unit and to one of the
    output terminals of the rectifier, and
  a circuit breaker connected to the first power input terminal
    of the power supply unit and to an input terminal of the
    rectifier, wherein
  at least one partial voltage of each voltage divider is used a
    signal for identifying the wrong supply voltage.

The main idea of the invention is the use of the above two voltage dividers. The voltage dividers provide partial voltage indicating the state of the power supply unit. In particular, the partial voltages indicate the wrong supply voltage.

In a preferred embodiment of the present invention the first voltage divider is provided for detecting the supply voltage in a normal operation mode. In another operation mode, the first voltage divider may be provided for evaluating the power of the detection circuit.

Further, the first voltage divider may be provided for detecting a surge voltage and/or a low voltage. In a similar way, the first voltage divider can be provided for synchronising a crosspoint detector.

In the preferred embodiment of the present invention it is provided, that the circuit breaker is a relay. The relay allows a confident switching of the power supply.

For example, the first power input terminal is provided for the neutral conductor of the power supply.

Further, the detection circuit may comprise a data processing unit for analysing the signals. In particular, the data processing unit includes at least one microprocessor.

The second voltage divider may be provided for generating a mains frequency clock signal. Thereby the microprocessor can be provided for synchronising a crosspoint voltage by the mains frequency clock signal. Thus, the microprocessor can control the relay synchronously with the crosspoint voltage.

According to the preferred embodiment of the present invention the power supply unit is provided for or part of a working appliance, in particular an induction hob and/or a cooking oven. The detection circuit may comprise or use electronic elements of other components of the cooking appliance, induction hob and/or cooking oven. Thereby, the first voltage divider may be provided for detecting the presence of a pot on the induction hob.

The object of the present invention is further achieved by the method according to claim 17.

According to the present invention the method comprises the steps of:

- detecting at least one first partial voltage between the output terminals of a rectifier of the power supply unit,
- detecting at least one second partial voltage between a first power input terminal of the power supply unit and one of the output terminals of the rectifier,
- using the first partial voltage and the second partial voltage as signals, and
- processing the signals in order to determine, if the power supply unit is connected to a wrong supply voltage.

The inventive method uses two different voltage dividers. The voltage dividers provide partial voltages indicating the state of the power supply unit. In particular, the partial voltages indicate the properties of the supply voltage.

In particular, the method is performed or performable, when the electric connection between at least one power input terminal and the rectifier is interrupted.

The first partial voltage may be used for detecting the supply voltage in a normal operation mode. In other operation mode the first partial voltage may be used for evaluating the power of the detection circuit, for detecting a surge voltage, for detecting a low voltage and/or for synchronising a crosspoint detector.

Preferably, the signals are processed by a data processing unit and/or a microprocessor.

In particular, the second partial voltage is provided for generating a mains frequency clock signal. In this case the microprocessor may synchronise a crosspoint voltage by the mains frequency clock signal. Further, the microprocessor may be provided for controlling the relay synchronously with the crosspoint voltage.

According to the preferred embodiment of the present invention the method is provided for a power supply unit of a cooking appliance, in particular an induction hob and/or a cooking oven. In this case, the first partial voltage may be used for detecting the presence of a pot on the induction hob.

At last, a computer program product is provided. Said computer program product is stored on a computer usable medium, comprising computer readable program means for causing a computer to perform the method described above.

The novel and inventive features believed to be the characteristic of the present invention are set forth in the appended claims.

Figure 1:
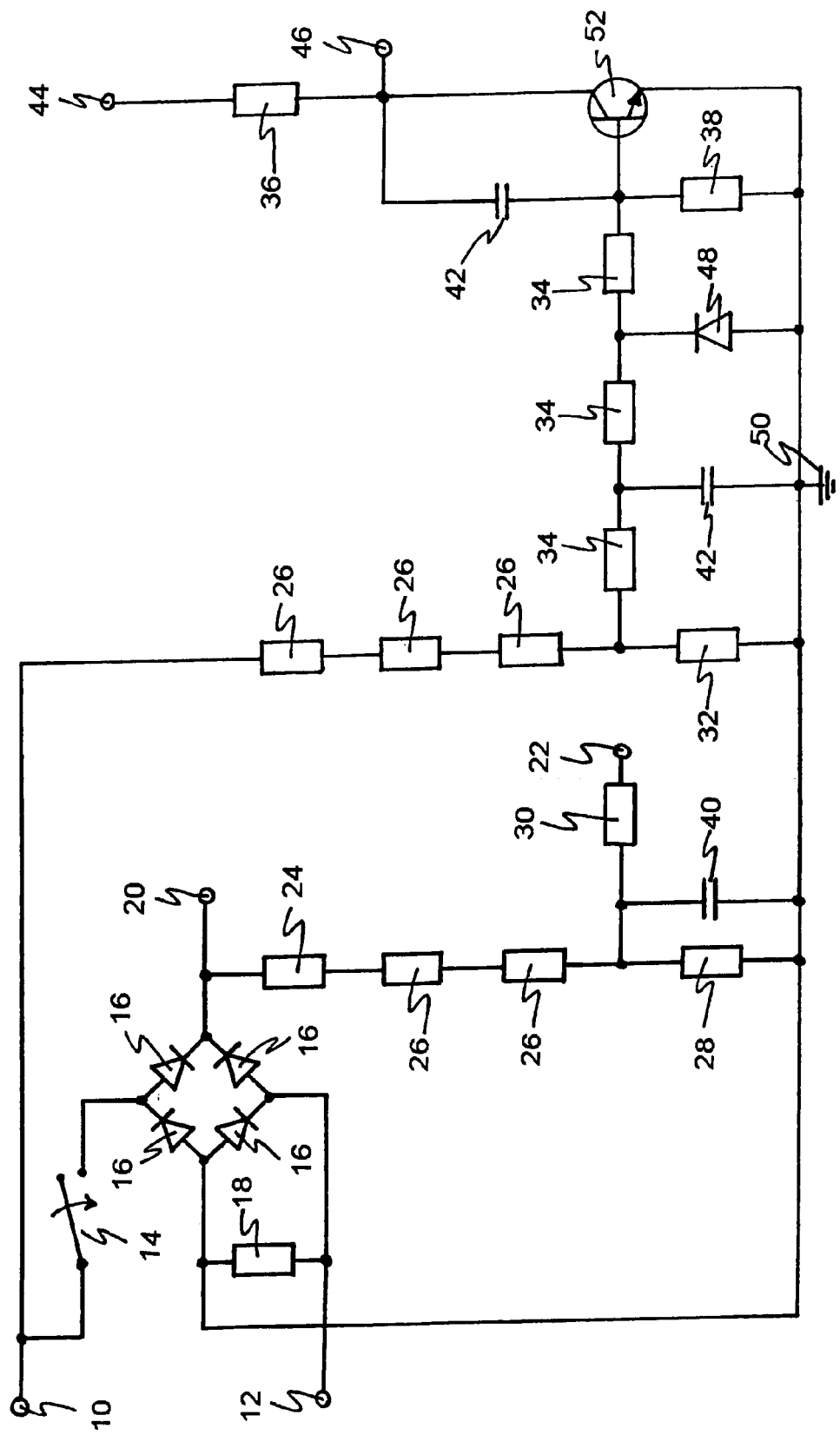

The invention will be described in further detail with reference to the drawing, in which FIG. 1 illustrates a schematic diagram of a detection circuit according to a preferred embodiment of the present invention, and FIG. 2 illustrates a schematic diagram of a detection circuit according to the prior art.

FIG. 1 illustrates a schematic diagram of a detection circuit according to a preferred embodiment of the present invention. The detection circuit comprises a first power input terminal 10 for the neutral conductor of an alternating current and a second power input terminal 12 for the phase of the alternating current. The first input terminal 10 and the second input terminal 12 are connected to a set of four diodes 16 forming a rectifier. Between the first input terminal 10 and the rectifier a relay 14 is interconnected.

Between a power output terminal 20 and a ground terminal 50 a series of a resistor element 24, two resistor elements 26 and a resistor element 28 is interconnected. The resistor element 24, the two resistor elements 26 and the resistor element 32 form a first voltage divider. A capacitor 40 is switched parallel to the resistor element 28. In this example the resistor element 24 has a resistance of 270 kΩ, the resistor elements 26 have a resistance of 220 kΩ, the resistor element 28 has a resistance of 8.2 kΩ and the capacitor 40 has a capacitance of 22 nF. The series with the elements 24, 26, 28 and 40 forms a voltage divider. Between the crosspoint of the resistor elements 26 and 28 and the capacitor 40 and a first signal output terminal 22, a resistor element 30 is interconnected.

Between the first power input terminal 10 and the ground terminal 50 a series of three resistor elements 26 and a resistor element 32 is interconnected. The three resistor elements 26 and the resistor element 32 form a second voltage divider. The crosspoint of the resistor element 26 and the resistor element 32 is connected to one end of a series of three resistor elements 34. The other end of said series to connected to the basis of a transistor 52. Between a first crosspoint of two neighboured resistor elements 34 and the ground terminal 50 a capacitor 42 is interconnected. Between a second crosspoint of two neighboured resistor elements 34 and the ground terminal 50 a diode 48 is interconnected. A resistor element 38 is connected to the basis and emitter of the transistor 52. A capacitor 42 is connected to the basis and collector of the transistor 52.

In this example the resistor elements 26 have a resistance of 220 kΩ, the resistor element 32 has a resistance of 47 kΩ, the resistor elements 34 have a resistance of 1 kΩ, the resistor element 38 has a resistance of 100 kΩ and the capacitors 42 have a capacitance of 10 nF.

The collector of the transistor 52 is connected to a second signal output terminal 46. The second signal output terminal 46 is connected via a resistor element 36 to a voltage input terminal 44. In this example on the voltage input terminal 44 is a direct voltage of 5 V and the resistor element 36 has a resistance of 2.2 kΩ.

The detection circuit according to the preferred embodiment of the present invention is able to recognize the wrong connection between the power supply unit and the supply voltage. In particular, the wrong connection may be recognized, if the relay 14 is open. In this case the current flows from the second power input terminal 12 via one diode 16 of the rectifier, the first voltage divider 24, 26 and 28, the second voltage divider 32 and 26 to the first power input terminal 10. Then the voltages of the signals on the first signal output terminal 22 and on the second signal output terminal 46 have values indicating that the voltage between the first power input terminal 10 and the second power input terminal 12 differs from a specified value.

FIG. 2 illustrates a schematic diagram of a detection circuit according to the prior art. The known detection circuit comprises a first input terminal 110 for the phase of the alternating current and a second input terminal 112 for the neutral conductor of the alternating current. The first input terminal 110 and the second input terminal 112 are connected via two metal oxide resistor elements 114 to a set of four diodes 116 forming a rectifier. The rectifier includes a first power output terminal 138 and a second power output terminal 140. Between the power output terminals 138 and 140 two electrolytic capacitors 118 are serially interconnected. Additionally, between the output terminals of the rectifier a series of three resistor elements 120 and a circuit with parallel elements are interconnected. Said parallel elements are a capacitor 122, a resistor element 124 and a series of a diode 126 and a resistor element 128.

Further, the known detection circuit comprises a transistor 130. The basis of the transistor 130 is connected to the crosspoint of the diode 126 and the resistor element 128. The emitter of the transistor 130 is connected to the second power output terminal 140. Between the collector and the emitter of the transistor 130 a series of a light emitting diode 132 and breakdown diode 134 is interconnected. The light emitting diode 132 is a first part of an optical coupler. A resistor element 136 is interconnected between the collector of the transistor 130 and a voltage input terminal 152.

A series of a resistor element 144 and a photoelectric cell 148 is interconnected between a further voltage input terminal 142 and a ground terminal 150. In this example the direct-current voltage on the voltage input terminal 142 is 5 V. The crosspoint between the resistor element 144 and the photoelectric cell 148 form a signal output terminal 146. The photoelectric cell 148 forms a second part of the optical coupler. There is no galvanic connection between the resistor element 144 and the photoelectric cell 148 on the one hand and the residual part of the circuit on the other hand. The only connection between said circuits is the light beam between the light emitting diode 132 and the photoelectric cell 148.

The alternating current between the first input terminal 110 and the second input terminal 112 is converted into a pulsating current by the rectifier. The electrolytic capacitors 118 convert the pulsating current into a substantial constant current. The circuitry on the left from the electrolytic capacitors 118 is provided to recognize, if the voltage between the power output terminals 138 and 140 exceeds a predetermined value. A corresponding signal is sent from the light emitting diode 132 to the photoelectric cell 148, if the voltage between the power output terminals 138 and 140 exceeds said predetermined value. From the signal output terminal 146 said corresponding signal is sent to a control unit, e.g. a microprocessor.

FIG. 2 shows that the detection circuit according to the prior art is more complex than the detection circuit according to the present invention. The known detection circuit comprises on optical coupler and more complex semiconductor elements. The present invention allows a reduction of complex components and a simplification of the detection circuit for detecting that the power supply unit is connected to the wrong supply voltage.

The present invention can also be embedded in a computer program product, which comprises all the features enabling the implementation of the method described herein. Further, when loaded in a computer system, said computer program product is able to carry out these methods.

Although illustrative embodiments of the present invention have been described herein with reference to the accompanying drawing, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 first power input terminal
12 second power input terminal
14 relay
16 diode
18 resistor element with 470 kΩ
20 power output terminal
22 first signal output terminal
24 resistor element with 270 kΩ
26 resistor element with 220 kΩ
28 resistor element with 8.2 kΩ
30 resistor element with 4.7 kΩ
32 resistor element with 47 kΩ
34 resistor element with 1 kΩ
36 resistor element with 2.2 kΩ
38 resistor element with 100 kΩ
40 capacitor with 22 nF
42 capacitor with 10 nF
44 voltage input terminal
46 second signal output terminal
48 diode
50 ground terminal
52 transistor
110 first input terminal
112 second input terminal
114 metal oxide resistor element
116 diode
118 electrolytic capacitor with 10 µF for 400 V
120 resistor element with 220 kΩ
122 capacitor with 220 pF
124 resistor element with 24 kΩ
126 breakdown diode
128 resistor element with 10 kΩ
130 transistor
132 light emitting diode
134 breakdown diode
136 resistor element with 1 kΩ
138 first power output terminal
140 second power output terminal
142 voltage input terminal
144 resistor element with 47 kΩ
146 signal output terminal
148 photoelectric cell
150 ground terminal
152 voltage input terminal

The invention claimed is:

1. A detection circuit for detecting that a power supply unit is connected to a wrong supply voltage, wherein said detection circuit comprises: a first voltage divider (24, 26, 28) connected to output terminals (20, 50) of a rectifier (16) of the power supply unit, a second voltage divider (26, 32) connected to a first power input terminal (10) of the power supply unit and to one of the output terminals (20, 50) of the rectifier (16), and a circuit breaker (14) connected to the first power input terminal (10) of the power supply unit and to an input terminal of the rectifier (16), wherein at least one partial voltage of each voltage divider (24, 26, 28; 26, 32) is used as a signal (22, 46), wherein the detection circuit further comprises a data processing unit for analyzing the signal from each voltage divider (22, 46), and wherein the data processing unit includes at least one microprocessor configured to identify the wrong supply voltage.

2. The detection circuit according to claim 1, characterized in, that the first voltage divider (24, 26, 28) is provided for detecting the supply voltage in a normal operation mode.

3. The detection circuit according to claim 1, characterized in, that the first voltage divider (24, 26, 28) is provided for evaluating the power of the detection circuit.

4. The detection circuit according to claim 1, characterized in, that the first voltage divider (24, 26, 28) is provided for detecting a surge voltage.

5. The detection circuit according to claim 1, characterized in, that the first voltage divider (24, 26, 28) is provided for detecting a low voltage.

6. The detection circuit according to claim 1, characterized in, that the first voltage divider (24, 26, 28) is provided for synchronising a crosspoint detector.

7. The detection circuit according to claim 1, characterized in, that the circuit breaker is a relay (14).

8. The detection circuit according to claim 1, characterized in, that the first power input terminal (10) is provided for a neutral conductor of the power supply.

9. The detection circuit according to claim 1, characterized in, that the second voltage divider (26, 32) is provided for generating a mains frequency clock signal.

10. The detection circuit according to claim 9, characterized in, that the microprocessor is provided for synchronising a crosspoint voltage by the mains frequency clock signal.

11. The detection circuit according to claim 10, characterized in, that the microprocessor is provided for controlling the circuit breaker (14) synchronously with the crosspoint voltage.

12. The detection circuit according to claim 1, characterized in, that the power supply unit is provided for a cooking appliance.

13. The detection circuit according to claim 12, wherein the cooking appliance is an induction hob and/or a cooking oven.

14. The detection circuit according to claim 13, characterized in, that the detection circuit comprises or uses electronic elements of other components of the induction hob and/or cooking oven.

15. The detection circuit according to the claim 13, characterized in, that the first voltage divider (24, 26, 28) is provided for detecting the presence of a pot on the induction hob.

16. A method for detecting that a power supply unit is connected to a wrong supply voltage, wherein said method comprises the steps of: detecting at least one first partial voltage between output terminals (20, 50) of a rectifier (16) of the power supply unit; detecting at least one second partial voltage between a first power input terminal (10) of the power supply unit and one of the output terminals (20, 50) of the rectifier (16), using the first partial voltage and the second partial voltage as signals (22, 46), and; processing the signals (22, 46) in order to determine if the if the power supply unit is connected to a wrong supply voltage.

17. The method according to claim 16, characterized in, that the method is performed or performable, when the electric connection between at least one power input terminal (10, 12) and the rectifier (16) is interrupted.

18. The method according to claim 16, characterized in, that the first partial voltage is used for detecting the supply voltage in a normal operation mode.

19. The method according to claim 16, characterized in, that the first partial voltage is used for evaluating the power of the detection circuit.

20. The method according to claim 16, characterized in, that the first partial voltage is used for detecting a surge voltage.

21. The method according to claim 16, characterized in, that the first partial voltage is used for detecting a low voltage.

22. The method according to claim 16, characterized in, that the first partial voltage is used for synchronising a crosspoint detector.

23. The method according to claim 16, characterized in, that the signals (22, 46) are processed by a data processing unit and/or a microprocessor.

24. The method according to claim 16, characterized in, that the second partial voltage is provided for generating a mains frequency clock signal.

25. The method according to claim 24, characterized in, that a microprocessor synchronises a crosspoint voltage by the mains frequency clock signal.

26. The method according to claim 25, characterized in, that the microprocessor is provided for controlling a relay (14) synchronously with the crosspoint voltage.

27. The method according to claim 16, characterized in, that the power supply unit is provided for a cooking appliance.

28. The method according to claim 27, wherein the cooking appliance is an induction hob and/or a cooking oven.

29. The method according to claim 16, characterized in, that the first partial voltage is used for detecting the presence of a pot on the induction hob.

30. A non-transitory computer readable medium on which is stored a computer program product for causing a computer to implement a method for detecting that a power supply unit is connected to a wrong supply voltage, wherein said method comprises the steps of: detecting at least one first partial voltage between output terminals (20, 50) of a rectifier (16) of the power supply unit, detecting at least one second partial voltage between a first power input terminal (10) of the power supply unit and one of the output terminals (20, 50) of the rectifier (16), using the first partial voltage and the second partial voltage as signals (22, 46), and processing the signals (22, 46) in order to determine, if the power supply unit is connected to a wrong supply voltage.

\* \* \* \* \*